(12) United States Patent
Al-Shafei et al.

(10) Patent No.: US 10,843,930 B1
(45) Date of Patent: Nov. 24, 2020

(54) SYSTEMS AND METHODS FOR SYNTHESIS OF ZSM-22 ZEOLITE

(71) Applicants: Saudi Arabian Oil Company, Dhahran (SA); King Fahd University of Petroleum and Minerals, Dhahran (SA)

(72) Inventors: Emad Naji Al-Shafei, Dhahran (SA); Oki Muraza, Dhahran (SA); Anas Karrar Jamil, Dhahran (SA); Ki-Hyouk Choi, Dhahran (SA); Zain Hassan Yamani, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/682,515

(22) Filed: Nov. 13, 2019

(51) Int. Cl.
| | |
|---|---|
| *C01B 39/04* | (2006.01) |
| *B01J 29/70* | (2006.01) |
| *B01J 19/12* | (2006.01) |
| *C01B 39/46* | (2006.01) |
| *C01B 39/48* | (2006.01) |

(52) U.S. Cl.
CPC ............. *C01B 39/04* (2013.01); *B01J 19/126* (2013.01); *B01J 29/7042* (2013.01); *C01B 39/46* (2013.01); *C01B 39/48* (2013.01); *C01P 2004/12* (2013.01); *C01P 2004/62* (2013.01); *C01P 2004/64* (2013.01)

(58) Field of Classification Search
CPC ......... C01B 39/04; C01B 39/46; C01B 39/48; C01P 2004/12; C01P 2004/62; C01P 2004/64; B01J 19/126; B01J 29/7042
See application file for complete search history.

(56) References Cited

U.S. PATENT DOCUMENTS

| | | |
|---|---|---|
| 4,481,177 A | 11/1984 | Valyocsik |
| 4,556,477 A | 12/1985 | Dwyer |
| (Continued) | | |

FOREIGN PATENT DOCUMENTS

| | | |
|---|---|---|
| CN | 103101924 A | 5/2013 |
| CN | 104211080 A | 12/2014 |
| (Continued) | | |

OTHER PUBLICATIONS

O. Muraza et al.,"Microwave-assisted hydrothermal synthesis of submicron ZSM-22zeolites and their applications in light olefin production "Microporous and Mesoporous Materials 206 (2015) 136-143 (Year: 2015).*

(Continued)

*Primary Examiner* — David M Brunsman
(74) *Attorney, Agent, or Firm* — Bracewell LLP; Constance G. Rhebergen; Kevin R. Tamm (57) ABSTRACT

Systems and methods for production of consistently-sized ZSM-22 zeolite catalyst crystals, a method including preparing an aluminate solution; preparing a silica solution; mixing the aluminate solution and the silica solution to form a zeolite-forming solution; heating the zeolite solution with microwave irradiation in a first, a second, a third, and a fourth distinct isothermal stage to produce the consistently-sized ZSM-22 zeolite catalyst crystals within a pre-selected crystal size range using a non-ionic surfactant.

18 Claims, 5 Drawing Sheets

(56) References Cited

U.S. PATENT DOCUMENTS

| | | | |
|---|---|---|---|
| 4,717,465 A | | 1/1988 | Chen et al. |
| 4,778,666 A | * | 10/1988 | Chu .................... C01B 33/2884 204/157.43 |
| 5,063,038 A | | 11/1991 | Kirker et al. |
| 5,157,194 A | | 10/1992 | Rahmim et al. |
| 5,254,770 A | | 10/1993 | Olson et al. |
| 7,119,245 B1 | | 10/2006 | Thoma et al. |
| 7,238,636 B2 | | 7/2007 | Beck et al. |
| 2011/0201861 A1 | * | 8/2011 | Bulut ...................... B01J 29/40 585/446 |
| 2014/0241981 A1 | * | 8/2014 | Dutta ...................... C01B 39/38 423/709 |
| 2015/0190792 A1 | * | 7/2015 | Muraza .................. C01B 39/46 423/705 |

FOREIGN PATENT DOCUMENTS

| | | |
|---|---|---|
| CN | 104671253 A | 6/2015 |
| CN | 105668582 A | 6/2016 |
| WO | 9325475 A1 | 12/1993 |
| WO | 9427934 A1 | 12/1994 |
| WO | 2015021611 A1 | 2/2015 |

OTHER PUBLICATIONS

A.K. Jamil et al., "Microwave-assisted solvothermal synthesis of ZSM-22 zeolite withcontrollable crystal lengths" Particuology 24 (2016) 138-141 (Year: 2016).*

Y. Hu et al., "Microwave-assisted hydrothermal synthesis of nanozeolites with controllable size"Microporous and Mesoporous Materials 119 (2009) 306-314 (Year: 2009).*

Jamil et al., "Controlling naphtha cracking using nanosized TON zeolite synthesized in the presence of polyoxyethylene surfactant", journal of Analytical and Applied Pyrolysis, 110, pp. 338-345, published Oct. 7, 2014.

Jamil et al., "Microwave-assisted solvothermal synthesis of ZSM-22 zeolite with controllable crystal lengths", Particuology, 24, pp. 138-141, 2016.

Jamil et al., "Selective Production of Propylene from Methanol Conversion over Nanosized ZSM-22 Zeolites", Ind. Eng. Chem. Res. 2014.

* cited by examiner

SYSTEMS AND METHODS FOR SYNTHESIS OF ZSM-22 ZEOLITE

BACKGROUND

Field

The present disclosure relates to systems and methods for producing consistently-sized ZSM-22 zeolite catalyst crystals. Specifically, the disclosure presents systems and methods that apply microwave heating to a zeolite solution comprising non-ionic surfactant for producing consistently-sized nano-scale ZSM-22 zeolite catalyst crystals.

Description of the Related Art

Hydrocarbon conversion reactions for petrochemical processes largely utilize zeolite-type materials for catalysts. Zeolites have been the subject of continuous developments and modifications for many years. The zeolites of Beta-type (BEA), Y-type, and ZSM-5-type structure are important as catalytic materials for chemical industry applications. ZSM-22 zeolite is identified as a one-dimensional-pore zeolite, and was discovered by Mobil Oil Corporation in the early 1980's. ZSM-22 is known as an orthorhombic, high-silica zeolite of a TON framework topology.

Zeolites are used in automotive emissions control, industrial off-gas purification, volatile organic carbon (VOC) reduction, and nitrogen oxides (NOx) reduction technologies. As process catalysts, they are used for fuel upgrading, production of petrochemical intermediates, and processing chemicals. BEA zeolites, for example, are also useful for adsorption purposes, such as odor removal and active carbon replacement. Growing demand for new catalytic chemical processing has led to a rise in the need for more reactive and selective catalysts. Nanotechnology for the production of catalytic material is essential to overcoming catalytic reaction limitations by allowing for greater dispersion of reactive catalysts, which leads to higher turnover of hydrocarbon conversion.

The TON zeolite framework consists of 5-, 6- and 10-membered rings. The TON zeolite framework group includes ZSM-22, Theta-1, Nu-10, KZ-2, and ISI-1 zeolites. The pore structure of the TON framework is known to be linear, one-dimensional, with 10-membered ring pore openings and effective pore sizes of about 0.45 nm by 0.55 nm.

Pores of ZSM-22 are smaller than the pores of ZSM-5, and are classified as a medium-pore on the zeolite size scale. ZSM-22 zeolite crystals synthesized by conventional hydrothermal synthesis include crystals that are needle-like with a crystal size in the range of about 1 µm to 20 µm. Conventional hydrothermal synthesis of ZSM-22 zeolite is known.

ZSM-22 zeolite has been shown to be a weak catalyst or catalyst support when applied as a steam cracker catalyst, and when applied in various reactions such as hydroisomerization, hydrocarbon upgrading, naphtha cracking, methanol conversion to gasoline, methanol conversion to propylene, butane conversion to olefins, and hexane conversion to olefins.

Micro-sized ZSM-22 zeolite is catalytically deactivated rapidly due to exhibiting pore sizes that can be easily blocked by coke from hydrocarbon conversion reactions. Prior art systems and processes for producing ZSM-22 zeolite catalyst crystals are insufficient for producing consistently-sized crystals without impurities and without agglomeration, particularly in the nano-size scale.

SUMMARY

Applicant has recognized a need for systems and methods which apply microwave heating to a zeolite solution comprising non-ionic surfactant for producing consistently-sized ZSM-22 zeolite catalyst crystals, particularly in the nano-scale less than 1 µm. Prior art technical problems include agglomeration during zeolite production and catalyst deactivation when used in hydrocarbon conversion reactions with steam.

Embodiments of systems and methods disclosed here allow for several size ranges of nano-scale ZSM-22 zeolite crystals to be consistently produced without agglomeration and without impurities. There is presently no suitable industrial process to make nano-scale ZSM-22. Here, ZSM-22 zeolite crystals of three unique size ranges are produced with lengths varying from about 50 nm to about 600 nm, and with widths ranging from about 55 nm to about 75 nm. In some embodiments of the process, one or more non-ionic surfactant and microwave heating is applied in four isothermal steps. Nonionic surfactants suitable in embodiments here include those nonionic surfactants based on polyoxyethylene. Systems and methods can be scaled to an industrial scale to manufacture nano zeolites for oil upgrading and hydrocarbon conversion reactions. By reducing crystals size, catalytic activity of the ZSM-22 crystals is surprisingly and unexpectedly enhanced.

In ZSM-22 zeolite crystals produced here, it is believed, without being bound by any theory or practice, that by increasing mesoporous pore-mouth openings to access larger hydrocarbon molecules, better catalytic activity is obtained because reaction diffusional length is shortened. Shortened diffusional length assists hydrocarbon molecules in contacting acidic sites of nano ZSM-22 for primary cracking reactions of hydrocarbons and reduces possible agglomeration of hydrocarbons and coking rates on the ZSM-22.

The nano-crystals of ZSM-22 zeolite framework start forming in a process of nucleation followed by crystallization. Systems and methods disclosed here produce nano-scale ZSM-22 crystals at smaller sizes without agglomeration, and produce uniform crystals both in terms of length and width. Crystal growth is uniquely controlled during manufacturing processes of the nano-scale ZSM-22 zeolite crystals.

Specifically controlled surfactant concentration of one or more nonionic surfactant in the processes reduces agglomeration of nano-scale ZSM-22 zeolite crystals during production.

Thus, disclosed here is a method for producing consistently-sized ZSM-22 zeolite catalyst crystals, the method including preparing an aluminate solution; preparing a silica solution; mixing the aluminate solution and the silica solution to form a zeolite-forming solution; heating the zeolite-forming solution with microwave irradiation in a first, a second, a third, and a fourth distinct isothermal stage to produce the consistently-sized ZSM-22 zeolite catalyst crystals within a pre-selected nano-scale crystal size range using a non-ionic surfactant.

In some embodiments, the step of preparing the aluminate solution comprises mixing deionized water, a hydroxide-containing compound, and an aluminum-containing compound. In other embodiments, the hydroxide-containing compound comprises at least one compound selected from the group consisting of: NaOH, CsOH, LiOH, Ca(OH)$_2$, and KOH, and the aluminum-containing compound comprises at least one compound selected from the group consisting of: of aluminum sulfate octadecahydrate, aluminum oxide, aluminum hydroxide, and aluminum metal. Still in other embodiments, the step of preparing an aluminate solution comprises mixing an organic template with the aluminate solution. In certain other embodiments, the organic template comprises at least one compound selected from the group consisting of: 1,6-diaminohexane, N-ethylpyridine, 1,4-diaminohexane, and diethylamine. Still in other embodiments, the step of preparing the silica solution comprises mixing a silica colloidal solution and water.

Still in yet other embodiments, the silica colloidal solution is about 40 wt. % silica in water. In certain embodiments, the step of mixing the aluminate solution and the silica solution to form the zeolite-forming solution comprises controlling a ratio of silicon to aluminum to produce the consistently-sized ZSM-22 zeolite catalyst crystals within a pre-selected crystal size range using the non-ionic surfactant. In certain embodiments, in the first isothermal stage microwave irradiation is applied to heat the zeolite solution to between about 35° C. and about 65° C. for between about 3 minutes and about 7 minutes, with stirring applied at a speed between about 200 rpm and about 300 rpm. In some embodiments, in the second isothermal stage microwave irradiation is applied to heat the zeolite solution to between about 90° C. and about 120° C. for between about 5 and about 15 minutes, with stirring applied at a speed between about 200 rpm and about 300 rpm. In certain embodiments, the non-ionic surfactant is added after the second isothermal stage. Still in yet other embodiments, the non-ionic surfactant includes a polyoxyethylene-based compound selected from the group consisting of: polyoxyethylene (2) stearly ether, polyoxyethylene (2) olleyl ether, polyoxyethylene (2) cetyl ether, sorbitan monopalmirate, sorbitan monolaurate, polyoxyethylene sorbitan monostearate, polyoxyethylene lauryl ether, polyoxyethylene sorbitan monooleate, polyoxyethylene (4,5) p-tert-octylphenol, polyoxyethylene sorbitan trioleate, polyoxyethylene sorbitan tristearate, polyoxyethylene (6) tridecyl ether, polyoxyethylene (10) stearyl ether, polyoxyethylene (10) oleyl ether, polyoxyethylene (7-8) p-tert-octylphenol, polyoxyethylene (10) cetyl ether, polyoxyethylene alkyl aryl ether, polyoxyethylene (9) p-tert-octylphenol, polyoxyethylene sorbitan monolaurate, polyoxyethylene (9-10) nonyl ohenol, polyoxyethylene (9-10) p-tert-octyl phenol, polyoxyethylene esters of mixed fatty acids, polyoxyethylene (12) tridecyl ether, polyoxyethylene (12-13) p-tert-octylphenol, polyoxyethylene sorbitan monostearate, polyoxyethylene (17) cetylstearyl alcohol, polyoxyethylene (20) stearyl ether, polyoxyethylene (20) oleyl ether, polyoxyethylene (15) tridecyl ether, polyoxyethylene sorbitan monopalmitate, polyoxyethylene (20) cetyl ether, polyoxyethylene (16) p-tert-octylphenol, polyoxyethylene sorbitan monolaurate, polyoxyethylenelauryl ether, and combinations of the same.

In other embodiments of the method, the third isothermal stage microwave irradiation is applied to heat the zeolite solution to between about 35° C. and about 65° C. for between about 60 and about 80 hours, with stirring applied at a speed between about 350 rpm and about 450 rpm. Still in other embodiments, in the fourth isothermal stage microwave irradiation is applied to heat the zeolite solution to between about 155° C. and about 205° C. for between about 8 and about 16 hours. In certain embodiments, the method includes the steps of neutralizing pH of the produced consistently-sized ZSM-22 zeolite catalyst crystals, water washing the produced consistently-sized ZSM-22 zeolite catalyst crystals, drying the produced consistently-sized ZSM-22 zeolite catalyst crystals, and calcining the produced consistently-sized ZSM-22 zeolite catalyst crystals.

Still in other embodiments, the step of calcining is carried out under static atmospheric air at a temperature of between about 500° C. and about 550° C. for between about 6 and about 12 hours. In certain embodiments, the method includes the step of applying the produced consistently-sized ZSM-22 zeolite catalyst crystals in a hydrocarbon conversion process.

Additionally disclosed here is a system for carrying out the various methods disclosed, the system including an aluminate solution mixing chamber; a silica solution mixing chamber; and a microwave-application mixing unit, the microwave-application mixing unit in fluid communication with both the aluminate solution mixing chamber and the silica solution mixing chamber. In some embodiments, the system comprises controllable stirring means in the aluminate solution mixing chamber, the silica solution mixing chamber, and the microwave-application mixing unit. In other embodiments, the microwave-application mixing unit is configured to carry out heating the zeolite solution with microwave irradiation in the first, the second, the third, and the fourth distinct isothermal stages to produce the consistently-sized ZSM-22 zeolite catalyst crystals within a pre-selected crystal size range. In embodiments of the systems and methods disclosed, a majority of the consistently-sized ZSM-22 zeolite catalyst crystals within the pre-selected nano-scale crystal size range exhibit lengths varying from about 50 nm to about 600 nm, and widths ranging from about 55 nm to about 75 nm.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of systems and methods that apply microwave heating to a zeolite solution comprising non-ionic surfactant for producing consistently-sized ZSM-22 zeolite catalyst crystals, as well as others, which will become apparent, may be understood in more detail, a more particular description of the embodiments of the present disclosure briefly summarized previously may be had by reference to the embodiments thereof, which are illustrated in the appended drawings, and which form a part of this specification. It is to be noted, however, that the drawings illustrate only various embodiments of the disclosure and are therefore not to be considered limiting of the present disclosure's scope, as it may include other effective embodiments as well.

Figure 1:
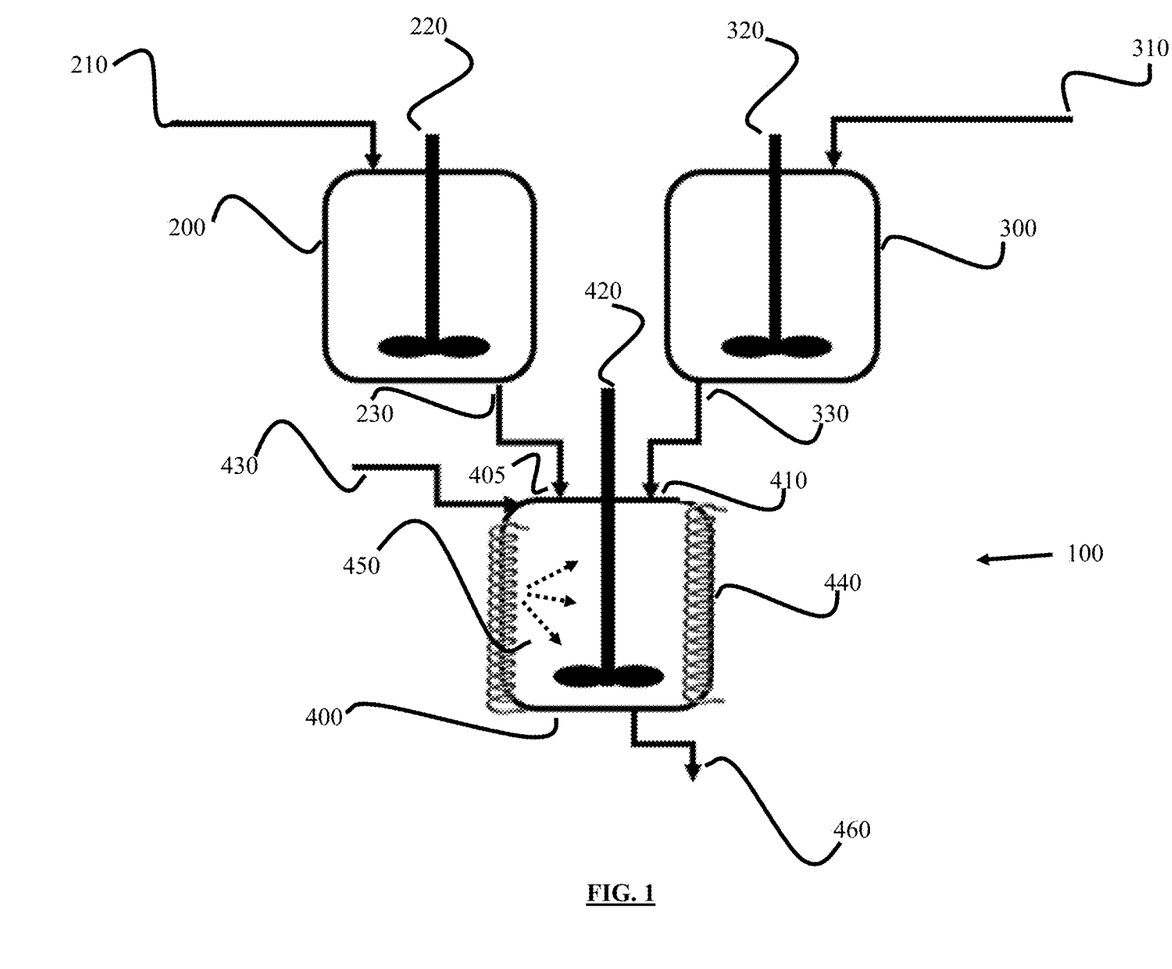
FIG. 1 is a schematic diagram for a system and process to produce consistently-sized ZSM-22 catalyst crystals without agglomeration or impurities using microwave heating and non-ionic surfactant.

Referring first to FIG. 1, a schematic diagram is shown for a system and process to produce consistently-sized nano-scale ZSM-22 catalyst crystals without agglomeration or impurities using microwave heating and non-ionic surfactant. FIG. 1 is described with respect to an example process for production of ZSM-22 zeolite crystals. Surfactant-microwave application system 100 includes an aluminate solution mixer unit 200 and a separate silicate solution mixer unit 300. System 100 also includes surfactant-microwave mixing unit 400, which is fluidly coupled to both aluminate solution mixer unit 200 and silicate solution mixer unit 300. Surfactant-microwave mixing unit 400 carries out controlled hydrothermal treatment for nucleation growth and crystallization of ZMS-22 nano-crystals.

In one example embodiment, a process operates as follows. In aluminate solution mixer unit 200, 88.4 kg of deionized water and 3.8 kg of potassium hydroxide (KOH) (purity: 99%) are introduced via line 210 and stirred at about between 270 rpm and about 330 rpm, preferably about 300 rpm, via stirring rod 220 at a temperature between about 15° C. and about 35° C. for between about 25 minutes and about 35 minutes, preferably about 30 minutes. Other suitable hydroxide-containing alkali and alkaline earth compounds can be used alternatively to or in addition to KOH, including, but not limited to, NaOH, CsOH, LiOH, or $Ca(OH)_2$.

Next, 1.8 kg of aluminum sulfate octadecahydrate (formula: $Al_2(SO_4)_3.18H_2O$) is introduced via line 210 to aluminate solution mixer unit 200 and mixed with the solution for between about 25 minutes and about 35 minutes, preferably about 30 minutes, with stirring via stirring rod 220 at between about 270 rpm and about 330 rpm, preferably about 300 rpm, at a temperature between about 15° C. and about 35° C. Other aluminum-containing compounds can be used in addition to or alternative to aluminum sulfate octadecahydrate including, but not limited to, aluminum oxide ($Al_2O_3$), aluminum hydroxide ($Al(OH)_3$), and aluminum metal (Al).

Next, 8.2 kg of 1,6-diaminohexane (DAH) (purity: 99.5%) is added to aluminate solution mixer unit 200 as an organic template via line 210 and stirred by stirring rod 220 at between about 270 rpm and about 330 rpm, preferably about 300 rpm, for between about 25 minutes and about 35 minutes, preferably about 30 minutes. In some embodiments, heating is not applied in aluminate solution mixer unit 200, and temperature is in the range of about 15° C. to about 35° C. Finally, the solution in aluminate solution mixer unit 200 is evacuated via outlet 230 to be introduced to surfactant-microwave mixing unit 400 via inlet 405. Other suitable organic templates can be used in addition to or alternative to DAH, including, but not limited to, N-ethylpyridine, 1,4-diaminohexane, or diethylamine.

Separately in silicate solution mixer unit 300, 36 kg of silica colloidal solution (40 wt. % in water) and 62 kg of water are introduced to the compartment via line 310. Stirring is applied via stirring rod 320 for between about 25 minutes and about 35 minutes, preferably about 30 minutes at a speed of between about 270 rpm and about 330 rpm, preferably about 300 rpm. In some embodiments, heating is not applied in silicate solution mixer unit 300, and temperature is in the range of about 18° C. to about 35° C. The solution is evacuated via outlet 330 and sent to surfactant-microwave mixing unit 400 via inlet 410.

Surfactant-microwave mixing unit 400 operates after the separate solutions of aluminate and silica are introduced to the unit via inlets 405 and 410. In one embodiment, four separate stages of isothermal heating are carried out with electrical heater 440 producing microwave irradiation 450 to synthesize the nano-sized ZSM-22. In a first isothermal stage, electrical heater 440 operates to heat the solution mixture in surfactant-microwave mixing unit 400 to between about 35° C. and about 65° C., or to between about 45° C. and about 55° C., for between about 3 minutes and about 7 minutes, preferably about 5 minutes. Mixing via stirring rod 420 is applied when microwave application begins via electrical heater 440 at a speed between about 200 rpm and about 300 rpm, preferably about 250 rpm.

In a second isothermal stage, a selected quantity of non-ionic surfactant is added via line 430. First, electrical heater 440 is set at a temperature of between about 90° C. and about 120° C., or between about 100° C. and about 110° C., and stirring is applied via stirring rod 420 at between about 200 rpm and about 300 rpm, preferably about 250 rpm, for between about 5 and about 15 minutes. Then, the selected weight of nonionic surfactant, for example a nonionic surfactant including poly-oxyethylene groups, is added to surfactant-microwave mixing unit 400 via line 430. In one embodiment, if polyoxyethylene(10)oleyl ether (molecular weight 709 g/mole) is used as surfactant, suitable surfactant to aluminium oxide molar ratios are from about 0.1:1 to 10:1, or from about 1:1 to about 7.5:1, or about 2.5:1, 5:1, or 7.5:1, for example.

Optional nonionic surfactants based on polyoxyethylene surfactants include, but are not limited to, any one of or any combination of: polyoxyethylene (2) stearly ether, polyoxyethylene (2) olleyl ether, polyoxyethylene (2) cetyl ether, sorbitan monopalmirate, sorbitan monolaurate, polyoxyethylene sorbitan monostearate, polyoxyethylene lauryl ether, polyoxyethylene sorbitan monooleate, polyoxyethylene (4,5) p-tert-octylphenol, polyoxyethylene sorbitan trioleate, polyoxyethylene sorbitan tristearate, polyoxyethylene (6) tridecyl ether, polyoxyethylene (10) stearyl ether, polyoxyethylene (10) oleyl ether, polyoxyethylene (7-8) p-tert-octylphenol, polyoxyethylene (10) cetyl ether, polyoxyethylene alkyl aryl ether, polyoxyethylene (9) p-tert-octylphenol, polyoxyethylene sorbitan monolaurate, polyoxyethylene (9-10) nonyl ohenol, polyoxyethylene (9-10) p-tert-octyl phenol, polyoxyethylene esters of mixed fatty acids, polyoxyethylene (12) tridecyl ether, polyoxyethylene (12-13) p-tert-octylphenol, polyoxyethylene sorbitan monostearate, polyoxyethylene (17) cetyl-stearyl alcohol, polyoxyethylene (20) stearyl ether, polyoxyethylene (20) oleyl ether, polyoxyethylene (15) tridecyl ether, polyoxyethylene sorbitan monopalmitate, polyoxyethylene (20) cetyl ether, polyoxyethylene (16) p-tert-octylphenol, polyoxyethylene sorbitan monolaurate, and polyoxyethylenelauryl ether.

The use of nonionic surfactants has several advantages versus long chain alcohols as there are no electronic charge groups or limited charge in the nonionic molecules. The utilization of surfactant helps control the sizes of nano-scale crystals of ZSM-22 without negatively affecting the zeolite framework and crystallinity. Systems and processes adapt the use of one or more nonionic surfactant to ZSM-22 zeolite crystal production under controlled microwave irradiation in order to meet the crystallinity of the ZSM-22 framework and synthesize different size scales of nano-sized of ZSM-22.

The weight of nonionic surfactant is adjusted, in part, according to the weight of aluminum oxide applied in the process. The molar ratio of the nonionic surfactant to aluminum oxide can vary from about 0.05:1 to 30:1.

Figure 2:
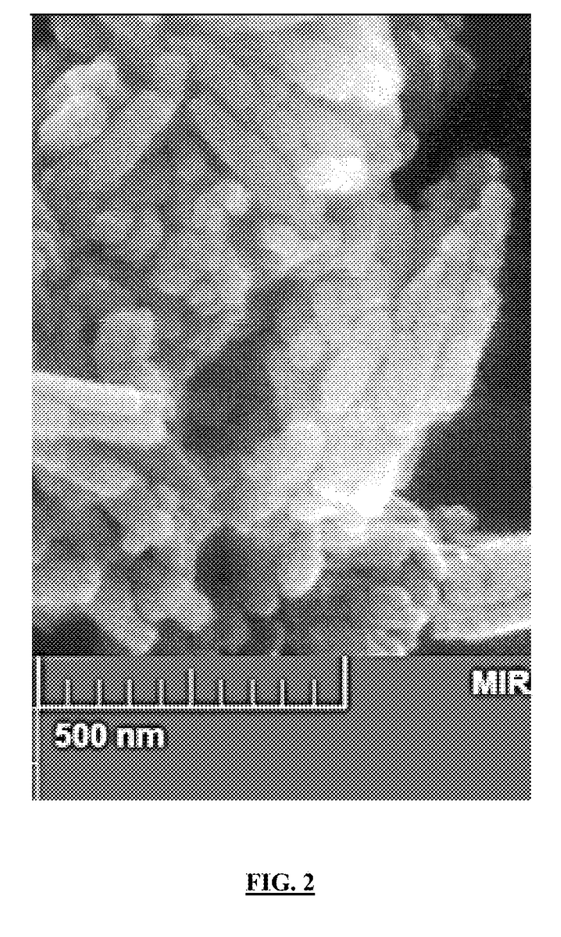
FIG. 2 shows a scanning electron microscope (SEM) image for crystals of nano-sized ZSM-22 zeolite produced at a surfactant to aluminum oxide molar ratio of 2.5.

For nano-scale ZSM-22 crystal size of length of about 80-95 nm by a width of about 55-65 nm, the surfactant to aluminum oxide molar ratio is between about 2.4 and about 2.6, preferably about 2.5 (See FIG. 2). For ZSM-22 crystal size of length of about 125-140 nm by a width of about 55-65 nm, the surfactant to aluminum oxide molar ratio is between about 4.9 and about 5.1, preferably about 5 (See FIG. 3). For nano-scale ZSM-22 crystal size of length of about 280-300 nm by a width of about 65-75 nm, the surfactant to aluminum oxide molar ratio is between about 7.4 and about 7.6, preferably about 7.5 (See FIG. 4).

In a third isothermal stage, zeolite aging is applied and electrical heater 440 is set such that the temperature of surfactant-microwave mixing unit 400 is between about 35° C. and about 65° C., or is between about 45° C. and about 55° C., and stirring is applied via stirring rod 420 at a speed of between about 350 rpm and about 450 rpm, preferably 400 rpm, for about 60 to about 80 hours, preferably about 72 hours.

In a fourth isothermal stage, zeolite crystallization is carried out, and microwave irradiation is applied to surfactant-microwave mixing unit 400 for heating, and the temperature increases to between about 155° C. and about 205° C., or between about 165° C. and about 195° C., or between about 170° C. and about 190° C., and stirring is applied via stirring rod 420 at a speed of between about 350 rpm and about 450 rpm, preferably 400 rpm, for between about 8 and about 16 hours, or between about 10 hours and about 14 hours.

At the end of crystallization of nano-sized ZSM-22, the fourth isothermal stage, surfactant-microwave mixing unit 400 is cooled down to between about 18° C. and about 40° C. Zeolite solution is evacuated via line 460 for further treatment in a separate container (not pictured). In the separate container, the acidity of the solution is adjusted to between about pH 6.5 and about pH 7.5, preferably about pH 7 (neutralized), by addition of HCl in water solution (concentration of about 0.1 mol/L), with the volume to be added from about 5 mL to about 200 mL, depending on the scale of the system and process.

After pH neutralization, a centrifuge is applied to collect the powder comprising nano-sized ZSM-22 zeolite crystals. The centrifuge is run at a speed between about 2000 rpm and about 4000 rpm and a temperature between about 18° C. and about 40° C. Next, distilled water washing is carried out 2-3 times to wash the zeolite powder, and the washed zeolite powder is retrieved via filtration. Drying is applied to nano-sized ZSM-22 zeolite powder at a temperature of between about 90° C. and about 100° C. for between about 12 and about 24 hours. Calcination of dried nano-sized ZSM-22 zeolite is carried out under static atmospheric air and at a temperature of between about 500° C. and about 550° C., preferably 525° C. for between about 6 and about 12 hours. The oven ramping rate can be set at between about 1 and about 3° C./min.

Figure 5:
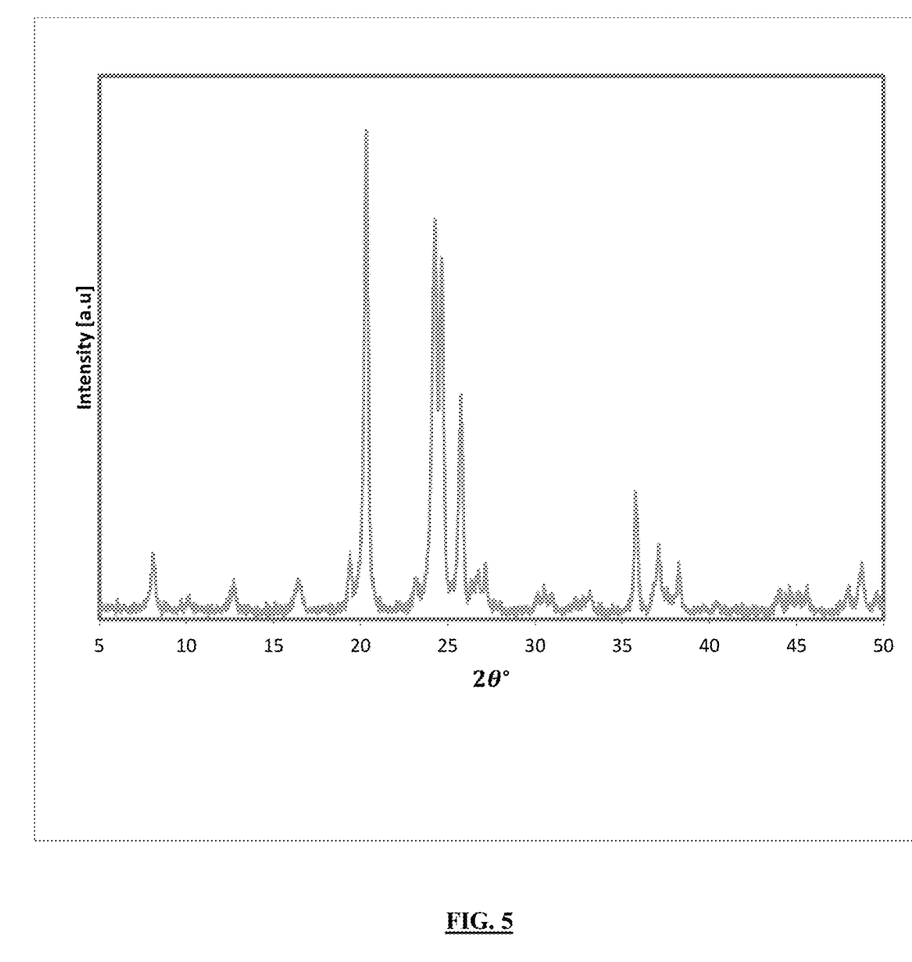
FIG. 5 shows X-ray diffraction (XRD) patterns confirming ZSM-22 structured zeolite was produced.

In some embodiments, the resulting zeolite has a framework crystal of nano-size ZSM-22 zeolite, and this is shown in FIG. 5. FIG. 5 shows X-ray diffraction (XRD) patterns of ZSM-22 zeolite. ZSM-22 is characterized via the 2-theta angle peaks at 20.4°, 24.4°, 24.6°, and 25.8°.

Thus, the surfactant-microwave system and process of FIG. 1 synthesizes nano-sized ZSM-22 zeolite with pre-selected recipes and process steps, which control sizes of nano-scale crystals produced in order to use ZSM-22 as catalyst. The ZSM-22 zeolite crystals produced can be used as material for catalyst support, and can be used for gas adsorption and catalyst applications in chemical and hydrocarbon conversion reactions, including those involving steam cracking.

FIG. 2 shows a scanning electron microscope (SEM) image for crystals of nano-sized ZSM-22 zeolite produced at a surfactant to aluminum oxide molar ratio of 2.5. The ratio of surfactant to aluminum oxide can vary for example between about 2.4 and about 2.6. In FIG. 2, the length of the zeolite crystals is between about 80 nm and about 95 nm, and the width is between about 55 nm and about 65 nm. In various embodiments a wide molar ratio range of Si:Al can be used, varying between about 10 and about 200.

Figure 3:
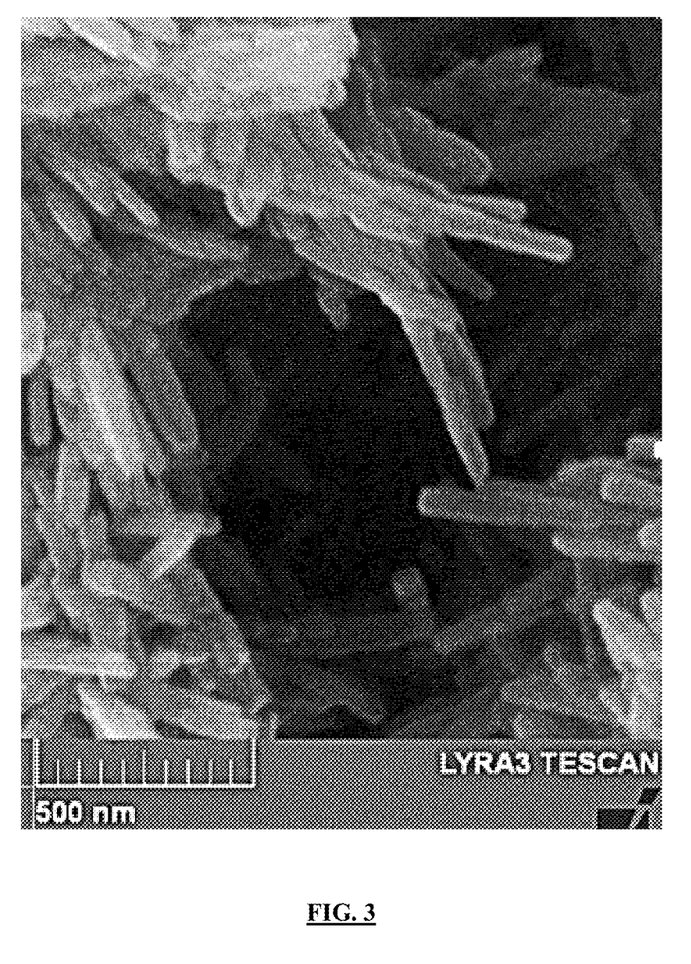
FIG. 3 shows a SEM image for crystals of nano-sized ZSM-22 zeolite produced at a surfactant to aluminum oxide molar ratio of 5.0.

FIG. 3 shows a SEM image for crystals of nano-sized ZSM-22 zeolite produced at a surfactant to aluminum oxide molar ratio of 5.0. The ratio of surfactant to aluminum oxide can vary for example between about 4.9 and about 5.1. In FIG. 3, the length of the zeolite crystals is between about 125 nm and about 140 nm, and the width is between about 55 nm and about 65 nm.

Figure 4:
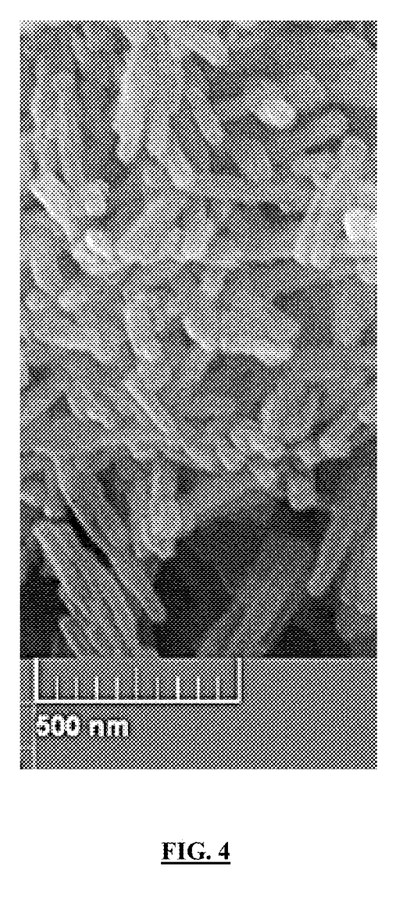
FIG. 4 shows a SEM image for crystals of nano-sized ZSM-22 zeolite produced at a surfactant to aluminum oxide molar ratio of 7.5.

FIG. 4 shows a SEM image for crystals of nano-sized ZSM-22 zeolite produced at a surfactant to alumina oxide molar ratio of 7.5. The ratio of surfactant to aluminum oxide can vary for example between about 7.4 and about 7.6. In FIG. 4, the length of the zeolite crystals is between about 280 nm and about 320 nm, and the width is between about 65 nm and about 75 nm.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of systems and methods which apply microwave heating to a zeolite solution comprising non-ionic surfactant for producing consistently-sized ZSM-22 zeolite catalyst crystals, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A method for producing consistently-sized ZSM-22 zeolite catalyst crystals, the method comprising the steps of:
   preparing an aluminate solution;
   preparing a silica solution;
   mixing the aluminate solution and the silica solution to form a zeolite-forming solution;
   heating the zeolite-forming solution with microwave irradiation in a first, a second, a third, and a fourth distinct isothermal stage to produce the consistently-sized ZSM-22 zeolite catalyst crystals within a pre-selected nano-scale crystal size range using a non-ionic surfactant.

2. The method according to claim 1, where the step of preparing the aluminate solution comprises mixing deionized water, a hydroxide-containing compound, and an aluminum-containing compound.

3. The method according to claim 2, where the hydroxide-containing compound comprises at least one compound selected from the group consisting of: NaOH, CsOH, LiOH, Ca(OH)$_2$, and KOH, and where the aluminum-containing compound comprises at least one compound selected from the group consisting of: of aluminum sulfate octadecahydrate, aluminum oxide, aluminum hydroxide, and aluminum metal.

4. The method according to claim 3, where the step of preparing an aluminate solution comprises mixing an organic template with the aluminate solution.

5. The method according to claim 4, where the organic template comprises at least one compound selected from the group consisting of: 1,6-diaminohexane, N-ethylpyridine, 1,4-diaminohexane, and diethylamine.

6. The method according to claim 1, where the step of preparing the silica solution comprises mixing a silica colloidal solution and water.

7. The method according to claim 6, where the silica colloidal solution is about 40 wt. % silica in water.

8. The method according to claim 1, where the step of mixing the aluminate solution and the silica solution to form the zeolite-forming solution comprises controlling a ratio of silicon to aluminum to produce the consistently-sized ZSM-22 zeolite catalyst crystals within a pre-selected crystal size range using the non-ionic surfactant.

9. The method according to claim 1, where in the first isothermal stage microwave irradiation is applied to heat the zeolite solution to between about 35° C. and about 65° C. for between about 3 minutes and about 7 minutes, with stirring applied at a speed between about 200 rpm and about 300 rpm.

10. The method according to claim 9, where in the second isothermal stage microwave irradiation is applied to heat the zeolite solution to between about 90° C. and about 120° C. for between about 5 and about 15 minutes, with stirring applied at a speed between about 200 rpm and about 300 rpm.

11. The method according to claim 10, where the non-ionic surfactant is added after the second isothermal stage.

12. The method according to claim 11, where the non-ionic surfactant includes a compound selected from the group consisting of: polyoxyethylene (2) stearly ether, polyoxyethylene (2) olleyl ether, polyoxyethylene (2) cetyl ether, sorbitan monopalmirate, sorbitan monolaurate, polyoxyethylene sorbitan monostearate, polyoxyethylene lauryl ether, polyoxyethylene sorbitan monooleate, polyoxyethylene (4,5) p-tert-octylphenol, polyoxyethylene sorbitan trioleate, polyoxyethylene sorbitan tristearate, polyoxyethylene (6) tridecyl ether, polyoxyethylene (10) stearyl ether, polyoxyethylene (10) oleyl ether, polyoxyethylene (7-8) p-tert-octylphenol, polyoxyethylene (10) cetyl ether, polyoxyethylene alkyl aryl ether, polyoxyethylene (9) p-tert-octylphenol, polyoxyethylene sorbitan monolaurate, polyoxyethylene (9-10) nonyl ohenol, polyoxyethylene (9-10) p-tert-octyl phenol, polyoxyethylene esters of mixed fatty acids, polyoxyethylene (12) tridecyl ether, polyoxyethylene (12-13) p-tert-octylphenol, polyoxyethylene sorbitan monostearate, polyoxyethylene (17) cetyl-stearyl alcohol, polyoxyethylene (20) stearyl ether, polyoxyethylene (20) oleyl ether, polyoxyethylene (15) tridecyl ether, polyoxyethylene sorbitan monopalmitate, polyoxyethylene (20) cetyl ether, polyoxyethylene (16) p-tert-octylphenol, polyoxyethylene sorbitan monolaurate, polyoxyethylenelauryl ether, and combinations of the same.

13. The method according to claim 11, where in the third isothermal stage microwave irradiation is applied to heat the zeolite solution to between about 35° C. and about 65° C. for between about 60 and about 80 hours, with stirring applied at a speed between about 350 rpm and about 450 rpm.

14. The method according to claim 13, where in the fourth isothermal stage microwave irradiation is applied to heat the zeolite solution to between about 155° C. and about 205° C. for between about 8 and about 16 hours.

15. The method according to claim 14, further comprising the steps of neutralizing pH of the produced consistently-sized ZSM-22 zeolite catalyst crystals, water washing the produced consistently-sized ZSM-22 zeolite catalyst crystals, drying the produced consistently-sized ZSM-22 zeolite catalyst crystals, and calcining the produced consistently-sized ZSM-22 zeolite catalyst crystals.

16. The method according to claim 15, where the step of calcining is carried out under static atmospheric air at a temperature of between about 500° C. and about 550° C. for between about 6 and about 12 hours.

17. The method according to claim 1, further comprising the step of applying the produced consistently-sized ZSM-22 zeolite catalyst crystals in a hydrocarbon conversion process.

18. The method according to claim 1, where a majority of the consistently-sized ZSM-22 zeolite catalyst crystals within the pre-selected nano-scale crystal size range exhibit lengths varying from about 50 nm to about 600 nm, and widths ranging from about 55 nm to about 75 nm.

* * * * *